No. 751,565. PATENTED FEB. 9, 1904.
G. E. SAVAGE & J. W. CHAPMAN.
COFFEE OR TEA POT.
APPLICATION FILED SEPT. 23, 1903.
NO MODEL.
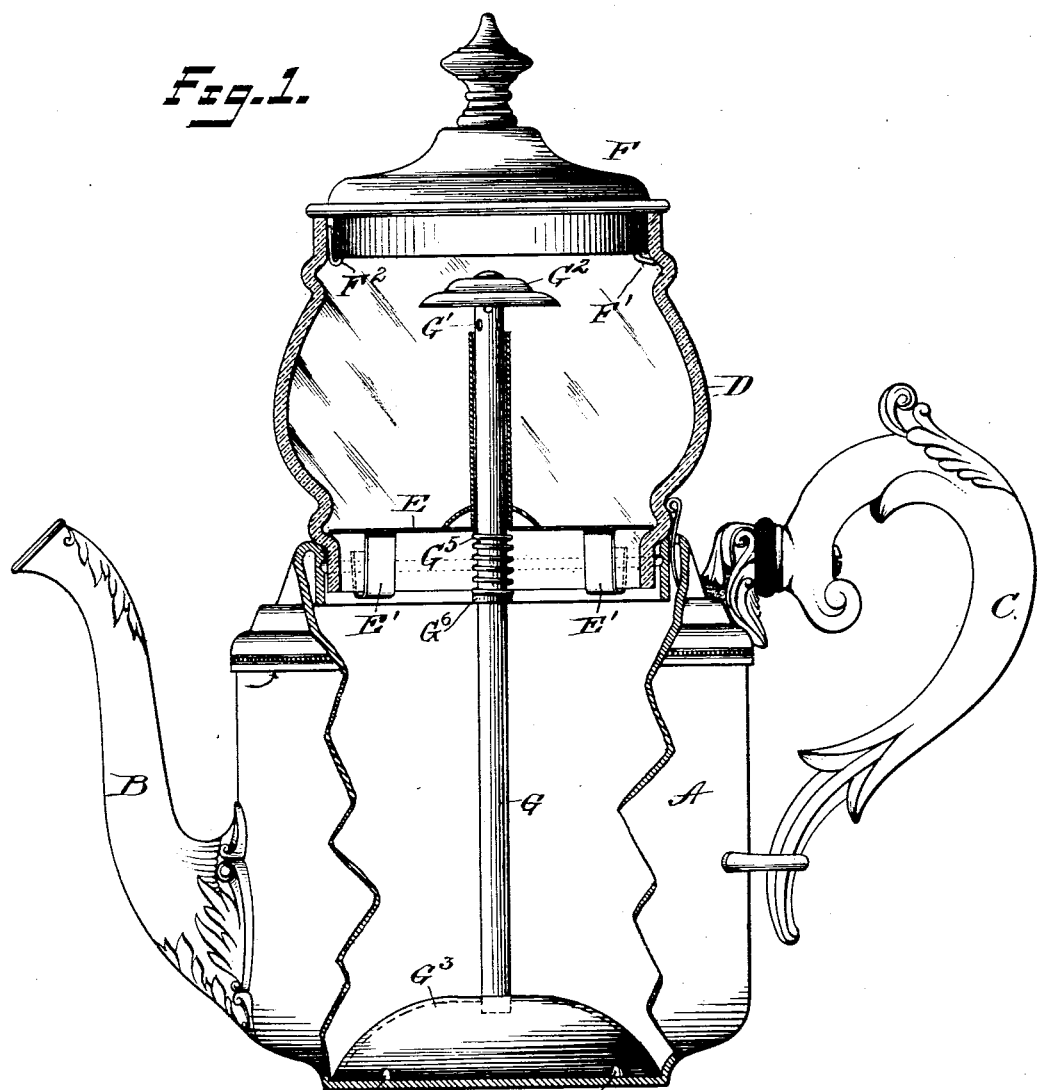
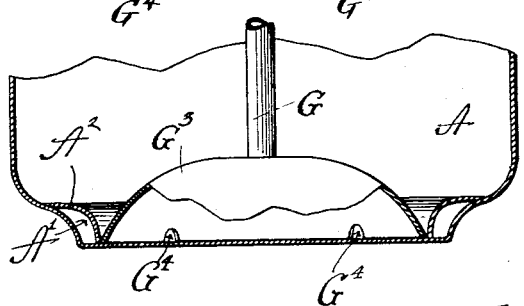
Witnesses
Inventors
Geo. E. Savage
James W. Chapman
By their Attorney No. 751,565. Patented February 9, 1904.

UNITED STATES PATENT OFFICE.

GEORGE E. SAVAGE AND JAMES W. CHAPMAN, OF MERIDEN, CONNECTICUT, ASSIGNORS TO MANNING, BOWMAN & CO., OF MERIDEN, CONNECTICUT, A CORPORATION OF CONNECTICUT.

COFFEE OR TEA POT.

SPECIFICATION forming part of Letters Patent No. 751,565, dated February 9, 1904.

Application filed September 23, 1903. Serial No. 174,340. (No model.)

*To all whom it may concern:*

Be it known that we, GEORGE E. SAVAGE and JAMES W. CHAPMAN, citizens of the United States, residing at Meriden, New Haven county, and State of Connecticut, have invented certain new and useful Improvements in Coffee or Tea Pots, of which the following is a full, clear, and exact description.

Our invention relates to coffee-pots and the like; and it consists in the novel and useful features of mechanical construction hereinafter described.

The pot includes a water-reservoir and a separate receptacle for holding ground coffee and the like and a percolating device detachable from the other parts, but so arranged as to be held in its desired position against becoming accidentally unseated or displaced when the parts are assembled for operation or when the coffee or other beverage is being poured.

Figure 1 is a side elevation of a coffee-pot embodying our invention, parts being broken away and parts shown in section. Fig. 2 is a cross-section of a fragment of the bottom of a pot, showing a modification.

A is a water-reservoir. B is a spout carried thereby.

C is a handle by which the reservoir and the associated parts may be tilted to pour the beverage.

D is a receptacle for containing the ground coffee or other seasoning element.

E is a strainer or filter between the chamber within the reservoir A and receptacle D, said strainer being perforated.

F is a cover for the receptacle D.

G is a percolator-tube provided with perforations $G'$ at or near its upper end and with a deflector $G^2$. The percolator-tube passes through approximately the center of the strainer or filter plate E, and the lower end of the tube G is fitted with a bell $G^3$, which rests upon the flat bottom of the reservoir A and provides a chamber underneath the same for the heating of the water and generation of steam. The bell covers the bottom of the reservoir and provides a relatively large space for heating and generation of vapors. This in large measure, however, prevents the overheating of the main body of the liquid, which would interfere with the operation. In Fig. 2 we have shown an auxiliary chamber $A'$, formed by the ring $A^2$, which also assists in confining the heat to the bell-covered liquid by preventing the liquid from circulating and contacting with the bottom of the receptacle outside the base of the bell and directing the liquid through the aperture $G^4$ into the bell $G^3$, whence it circulates through the tube G and strainer E back into the reservoir A to again pass into the bell without contact with the bottom of the reservoir outside the bell. This also permits the use of a larger base while still using a bell which can be removed through the top of the pot. The lower edges of the bell are provided with perforations or notches $G^4$, through which circulation may be maintained. Upon the percolator-tube G is a shoulder $G^5$, which is preferably yielding. This shoulder is preferably formed by a coiled spring resting at its lower end upon the collar or projection $G^6$ on the tube G, while its upper end is free and is so located relatively to the strainer E when the parts are assembled that the said strainer will engage and slightly compress said spring, which latter in turn presses the tube downwardly so that the bell $G^3$ may be firmly seated against the bottom of the reservoir A, thus preventing the latter from becoming unseated either during the process of making the beverage or when the beverage is being poured, whether the cover of the receptacle is on or off.

All of the parts thus described are detachable one from another, but when assembled are held firmly in place. The strainer serves as a means to hold the percolator-tube against accidental detachment. The receptacle D is held against accidental detachment by means of spring-clips $E'$ $E'$, which may be secured to the strainer E and pass down around the lower edge of the receptacle D and up around the outer face of the same, so as to engage with the reservoir adjacent to its top opening. A hook $F'$ and clip $F^2$ may serve to keep the cover F in place. Since the special means for holding the receptacle D and cover F in place are made the subject-matter of another application, they need not be described in detail herein, but will be understood generally from the drawings and the foregoing description.

While we have described our invention as applied to a coffee-pot, it is obvious that the apparatus may be used for making any other beverage.

In operation heat is applied to the bottom of the reservoir A, whereupon vapors are generated within the bell $G^3$, which rise through the tube G and pass out through the perforations $G'$ and are directed downward by the deflector $G^2$ against the seasoning element held in the receptacle D, where it is condensed and takes up the flavor of the seasoning element and then drips through the filter into the reservoir A. The strength of the flavoring of the liquid increases steadily during the continuance of the process until the required flavor has been obtained. When the beverage is of the proper strength, the user may pour the same, the parts being held together in such a way as to prevent any dislodgment of the same.

What we claim is—

1. In an apparatus of the character described, a water-reservoir, a receptacle for the seasoning element, means for detachably securing said parts together, a strainer separating the compartments in said reservoir and receptacle, a percolating device comprising a tube, a bell at the lower end thereof arranged to rest upon the bottom of the reservoir and means engaging the strainer and said tube and arranged to hold said bell against its seat independently of the cover for the receptacle.

2. In an apparatus of the character described, a water-reservoir, a receptacle for the seasoning element, means for detachably securing together said parts, a strainer carried by the said receptacle and separating the compartment therein from the compartment in the reservoir, a percolating device including a tube, a bell at its lower end, said bell being arranged to rest upon the bottom of the reservoir, said tube projecting through said strainer and guided thereby and a spring arranged to press against said tube and said strainer to yieldingly press the bell against its seat.

3. An apparatus of the character described comprising a water-reservoir, a receptacle above the same with a strainer between the reservoir and the receptacle, a bell resting on the bottom of the reservoir, a tube connected with said bell and communicating with the receptacle, and an annular chamber in the bottom of the reservoir surrounding the bell, said bell being removable through the top of the reservoir.

Signed at Meriden, Connecticut, this 19th day of September, A. D. 1903.

GEORGE E. SAVAGE.
JAMES W. CHAPMAN.

Witnesses:
E. J. POOLEY,
A. L. STETSON.